(12) United States Patent
Torvalds et al.

(10) Patent No.: US 6,714,904 B1
(45) Date of Patent: *Mar. 30, 2004

(54) SYSTEM FOR USING RATE OF EXCEPTION EVENT GENERATION DURING EXECUTION OF TRANSLATED INSTRUCTIONS TO CONTROL OPTIMIZATION OF THE TRANSLATED INSTRUCTIONS

(75) Inventors: Linus Torvalds, Santa Clara, CA (US); David Keppel, Seattle, WA (US)

(73) Assignee: Transmeta Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/417,358

(22) Filed: Oct. 13, 1999

(51) Int. Cl.$^7$ .............................................. G06F 9/455
(52) U.S. Cl. ........................ 703/26; 703/27; 712/209; 712/227
(58) Field of Search ................................ 711/202–206; 712/209, 239, 227; 703/26, 27, 28

(56) References Cited

U.S. PATENT DOCUMENTS

| 4,794,522 | A | * | 12/1988 | Simpson | 364/200 |
|---|---|---|---|---|---|
| 5,596,390 | A | * | 1/1997 | Sawada | 399/8 |
| 5,668,969 | A | * | 9/1997 | Fitch | 711/202 |
| 5,751,942 | A | * | 5/1998 | Christensen et al. | 714/38 |
| 5,751,982 | A | * | 5/1998 | Morley | 712/209 |
| 5,790,625 | A | * | 8/1998 | Arimilli | 377/54 |
| 5,790,825 | A | * | 8/1998 | Traut | 712/209 |
| 5,832,205 | A | * | 11/1998 | Kelly et al. | 714/53 |
| 6,031,992 | A | | 2/2000 | Cmelik et al. | |
| 6,052,708 | A | * | 4/2000 | Flynn et al. | 709/108 |
| 6,351,844 | B1 | * | 2/2002 | Bala | 712/227 |
| 6,356,615 | B1 | * | 3/2002 | Coon et al. | 377/16 |
| 6,463,582 | B1 | * | 10/2002 | Lethin et al. | 717/158 |

OTHER PUBLICATIONS

Hölzle, Urs, *Adaptive Optimization for SELF: Reconciling High Performance with Exploratory Programming*, Doctorial Dissertation, Aug. 1994.*

Cifuentes, Cristina and Malhotra, Vishv, *Binary Translation: Static, Dynamic, Retargetable?*, International Conference on Software Mainteance, Nov. 4–8, 1996.*

* cited by examiner

*Primary Examiner*—Richard L. Ellis

(57) ABSTRACT

A method for modifying operating conditions within a computer which translates instructions from a target instruction set to a host instruction set including the steps of monitoring an event occurring within a component of the computer, counting events occurring within a selected interval, generating an exception if a total of events within the selected interval exceeds a prescribed limit, and responding to the exception by modifying a translated sequence of host instructions.

20 Claims, 2 Drawing Sheets

SYSTEM FOR USING RATE OF EXCEPTION EVENT GENERATION DURING EXECUTION OF TRANSLATED INSTRUCTIONS TO CONTROL OPTIMIZATION OF THE TRANSLATED INSTRUCTIONS

BACKGROUND OF THE INVENTION

1. Field of the Invention

This invention relates to computer systems and, more particularly, to methods for increasing the efficiency of operation of a microprocessor which dynamically translates instructions from a target instruction set to a host instruction set and speculates on translated operations.

2. History of the Prior Art

Recently, a new microprocessor was developed which combines a simple but very fast host processor (called a "morph host") and software (referred to as "code morphing software") to execute application programs designed for a "target" processor having an instruction set different than the instruction set of the morph host processor. The morph host processor executes the code morphing software to translate the application programs dynamically into morph host processor instructions able to accomplish the purpose of the original target software. As the target instructions are translated, the new host instructions are both executed and stored in a translation buffer where they may be accessed without further translation. Although the initial translation of a program is slow, once translated, many of the steps normally required for hardware to execute a program are eliminated. The new microprocessor has demonstrated that a simple fast processor designed to expend little power is able to execute translated "target" instructions at a rate equivalent to that of the "target" processor for which the programs were designed.

In order to be able to run programs designed for other processors at a rapid rate, the morph host processor includes a number of hardware enhancements. One of these enhancements is a gated store buffer which resides between the host processor and the translation buffer. A second enhancement is a set of host registers (in addition to normal working registers) which store known state of the target processor at the beginning of any sequence of target instructions being translated. Memory stores generated as sequences of morph host instructions are executed are placed in the gated store buffer. If the morph host instructions execute without raising an exception, the target state at the beginning of the sequence of instructions is updated to the target state at the point at which the sequence of translated instructions completed and the memory stores are committed to memory.

If an exception occurs during the execution of a sequence of host instructions, processing stops; and the entire operation may be returned to the beginning of the sequence of instructions at which known state of the target processor exists. This allows very rapid and accurate handling of exceptions, a result which has never been accomplished by the prior art.

It will be noted that the method by which the new microprocessor handles the execution of translations by placing the effects generated by execution in temporary storage until execution of the translation has been completed is effectively a very rapid method of speculation. The new microprocessor, in fact, uses the same circuitry for speculating on the outcome of other operations. For example, by temporarily holding the results of execution of instructions reordered by a software scheduler from naively translated instructions, more aggressive reordering may be accomplished than has been attempted by the prior art. When such a reordered sequence of instructions executes to produce a correct result, the memory stores resulting from execution of the reordered sequence may be committed to memory and target state may be updated. If the reordered sequence generates an exception while executing, then the state of the processor may be rolled back to target state at the beginning of the sequence and a more conservative approach taken in translating the sequence.

One of the most advantageous features of the new microprocessor is its ability to link together long sequences of translated instructions. Once short sequences of target instructions have been translated and found to execute without exception, it is possible to link large numbers of these short sequences together to form long sequences of instructions. This allows a translated program to be executed at great speed because the microprocessor need not go through all of the steps (such as looking up each of the shorter translated sequences) normally taken by hardware processors to execute instructions. Even more speed may be attained than might be expected because, once long sequences are linked, it is often possible for an optimizer to eliminate many of the steps from the long sequences without changing the results produced. ,Hardware, optimizers have never been able to handle sequences of instructions long enough to allow the patterns which allow significant optimization to become apparent.

A problem which has occurred with the new processor relates to sequences of instructions which are executed only an insignificant number of times. For example, instructions required to initiate operation of a particular application program are often executed only when the application is first called; and instructions required to terminate operation of an application are often executed only when the program is actually terminated. The original embodiment of the new processor typically treated all instructions in the same manner. It would decode a target instruction, generate the primitive host instructions which carry out the function for which the target instruction is designed, optimize the sequence of host instructions, and then store the translated and optimized instructions in the translation buffer. As the operation of the new processor proceeded, the sequences of translated instructions would be linked to one another and further optimized; and the longer sequences of linked instructions would be stored in the translation buffer. Ultimately, large blocks of translated instructions were stored as super-blocks of host instructions. When an exception occurred during execution of a particular host instruction or linked set of instructions, the new processor would go through the process of rolling back to the last correct state of the target processor and then provide single-step translations of the target instructions from the point of the last correct state to the point at which the exception again occurs. These translations would also be stored in the translation buffer. This embodiment of the new processor is described in detail in U.S. Pat. No. 5,832,205, Kelly et al., issued Nov. 3, 1998, and assigned to the assignee of the present invention.

Although this process creates code which executes rapidly, the process has a number of effects which limit the overall speed attainable and may cause other undesirable effects. First, the process requires a substantial amount of storage capacity for translated instructions. Many times a number of different translations exist for the same set of target instructions because the sequences were entered from different branches. Once stored, the translated instructions occupy the translation buffer until removed for some affirmative reason. Second, if a sequence of instructions is to be executed only a few times, the time required for translating and optimizing may be significantly greater than that needed to execute a step-by-step translation of the initial target instructions. The optimization of little used sequences of translated instructions tends to lower the average speed of the new processor.

For these reasons, the described embodiment of the new processor was modified to include as a part of the code morphing software, an interpreter which accomplishes step-by-step translation of each of the target instructions. An interpreter essentially fetches a target instruction, decodes the instruction, provides a host process to accomplish the purpose of the target instruction, and executes the host process. When it finishes interpreting and executing one target instruction, the state of the target processor is brought up to date; and the interpreter proceeds to the next target instruction. This process essentially single steps through the interpretation and execution of target instructions. The host instructions produced by the interpreter are not typically stored in the translation buffer so optimizing, linking, and the further optimizations available after linking are not carried out. The interpreter continues this process for the remainder of the sequence of target instructions.

It was determined that, in general, not until some number of executions of any sequence of instructions have occurred does the time required for all of the previous interpretations and executions become equal to the time required to translate and optimize the sequence. Consequently, a sequence of instructions which is little used during the execution of an application often executes more rapidly when it is simply interpreted rather than translated.

In order to make use of this advantage, the improved processor was modified to utilize the interpreter whenever a sequence of target instructions is first encountered. The interpreter software is associated with a counter which keeps track of the number of times sequences of target instructions are executed. The interpreter may be run each time the sequence is encountered until it has been executed some number of times without generating an exception. When sequences of target instructions have been interpreted and executed some selected number of times, the code morphing software switches from the interpreter to the translator and its attendant optimization and storage processes. When this occurs, a sufficient number of executions will have occurred that it is probable that further execution of the sequence of instructions will occur; and a stored optimized translation will provide significantly faster execution of the application as a whole.

When the code morphing software switches to the normal translation process, the translation is optimized and stored in the translation buffer. Thereafter, that translation may be further optimized and linked to other translations so that the very high speeds of execution realized from such processes may be obtained.

If the interpreter is utilized to collect statistics in addition to the number of times a particular sequence of instructions has been executed, additional significant advantages may be obtained. For example, if a sequence includes a branch, the address of the instruction to. which it branches may be recorded along with the number of times the branch has been executed. Then, when a number of sequential instructions are executed by the interpreter, a history of branching and branch addresses will have been established. These statistics may be utilized to speculate whether a particular sequence of instructions is probably going to become a super-block of translated instructions. After being interpreted for a selected number of times, the sequence may be translated, optimized, linked through the various branches without the necessity to go through a separate linking operation, and stored as such in the translation buffer. If the speculation turns out to be true, then significant time is saved in processing the instructions. If not, the operation simply causes an exception which returns the code morphing software to the interpreter.

Not only is the interpreter useful for generating host code for sequences which are used infrequently, it is also utilized in handling exceptions. Whenever the modified processor encounters a target exception while executing any translated target application, the code morphing software causes a rollback to occur to the last known correct state of the target processor. Then the code morphing software utilizes the interpreter rather than the translator to provide a new set of host instructions. The interpreter single steps through the generation and execution of target instructions, bringing target state up to date as each instruction is interpreted.

The interpreter continues this process through the sequence of target instructions until the exception again occurs. At this point, the state of the target processor is correct for the state of the interpretation so that the exception can be handled correctly and expeditiously. Because the interpretation process is so simple, the process of determining the point of occurrence of a target exception is significantly faster than the determination of such a point when carried out by the translation process which goes through the above-described translation and optimization process and then is stored in the translation buffer. Moreover, interpretation does not generate additional sequences of host instructions which are stored in the translation buffer and help to overfill that buffer.

By combining the interpreter with the optimizing translator which functions as a dynamic compiler of sequences of translated instructions, the code morphing software removes many of the limits to the upper speed of execution of target applications by the new processor. The use of the interpreter to handle early executions of sequences of instructions eliminates the need to optimize sequences of instructions which are little used during execution of the application and thereby increases the speed of operation. The elimination of the need to store these little used sequences of instructions ,in the translation buffer reduces the need for storage and eliminates the need for discarding many translated instructions. The use of the interpreter to handle exceptions produces the same useful effects as using the translator yet speeds operations and reduces storage requirements.

The improved embodiment of the new processor is described in detail in U.S. patent application Ser. No. 09/417,332, entitled Method For Integration Of Interpretation And Translation In A Microprocessor, R., Bedichek et al., filed on even date herewith, and assigned to the assignee of the present invention.

Recently, the processor has been further modified to enhance the utilization of the interpreter and translator. This has been accomplished by providing more than two modes of operation. Because it is often true that a translation once completed and optimized is not used extensively even though the sequence has been used frequently before translation, additional modes of operation are provided between the simple interpretation and the optimized translation. For example, a sequence of target instructions may be first executed by an interpreter for a number of times, then translated with minimal optimization and stored in the translation buffer. The translated sequence is operative and executes more rapidly than does interpretation; however, if sufficient time were allotted, it might be optimized to a much greater extent. To decide whether to further optimize the sequence by among other things linking it to other sequences, a second test may be run. This test essentially reviews the amount of time being spent in the interpretation or translation processes in order to determine the system is running efficiently.

This provision of multiple levels of translation with different tests for moving from one level to another significantly enhances the operation of the improved processor. This improved embodiment of the new processor is described in detail in U.S. patent application Ser. No. 09/417,979, entitled Method Of Changing Modes Of Code Generation, Torvalds et al., filed on even date herewith, and assigned to the assignee of the present invention.

Even though the various combinations of an interpreter and a translator greatly improve the operation of the unique microprocessor, some problems in operation remain. These problems may be generally described as an inability to utilize the various available functions optimally. One example of this occurs when a sequence of instructions which includes an internal branch is translated based on a presumption that a particular branch will be taken. When the sequence is translated, that branch may be consistently taken much more often than the other possible branch. However, as circumstances change, the other branch may be taken more often than the one for which the translation was optimized. This may occur because data controlling a branch may change or because a process used during startup or shutdown functions differently when used during normal operation of a program. In such a case, the original translation is still perfectly operative; but it is optimized to favor the wrong branch. Taking the branch other than the branch for which the sequence was optimized causes the translation to rollback and utilize the interpreter to provide a sequential set of host instructions. When this occurs more often than the translation is executed, overall processor speed is significantly reduced.

However, the translation remains in the translation buffer. The translation is still perfectly operative and may be used later in running the application. The translation buffer continues to store each new translation which executes correctly. After some number of new translations have been provided, the translation buffer tends to fill limiting the new translations which may be stored. This then slows the operation of the improved processor.

It is desirable to improve the operational speed of the improved microprocessor so that it executes more rapidly by modifying the processes for controlling the use of the interpreter and translator software of the code morphing software to make those processes responsive to changing conditions experienced during operation of the improved processor.

SUMMARY OF THE INVENTION

It is, therefore, an object of the present invention to provide a faster microprocessor compatible with and capable of running application programs and operating systems designed for other microprocessors at a faster rate.

This and other objects of the present invention are realized by a method for modifying operating conditions within a computer which translates instructions from a target instruction set to a host instruction set including the steps of monitoring an event occurring within a component of the computer, counting events occurring within a selected interval, generating an exception if a total of events within the selected. interval exceeds a prescribed limit, and responding to the exception by changing a translated sequence of host instructions.

These and other objects and features of the invention will be better understood by reference to the detailed description which follows taken together with the drawings in which like elements are referred to by like designations throughout the several views.

DETAILED DESCRIPTION

As explained above, a translation may exhibit at least two different sorts of behavior which it is desirable to improve in order to improve overall processing speed. A sequence of instructions may have been poorly translated because there was insufficient experience at the time of the translation to determine that it should be more highly optimized. If such a translation, rather than being simply slow, generates a large number of rollbacks, then the translation probably needs to be discarded and redone. On the other hand, a translation may have been perfectly translated and well optimized initially, but circumstances may have changed so that the optimizing conditions no longer exist. Consequently, such a translation is also incurring many more rollbacks than is desirable to maintain processing speed.

In accordance with the present invention, the operating conditions of the computer are evaluated during operation and the results obtained are used to modify the translations which are executing, In one embodiment, if a translation is slowing the operation of the computer significantly, that translation is discarded so that the processor and its code morphing software may generate more efficient sequences of host instructions.

Figure 1:
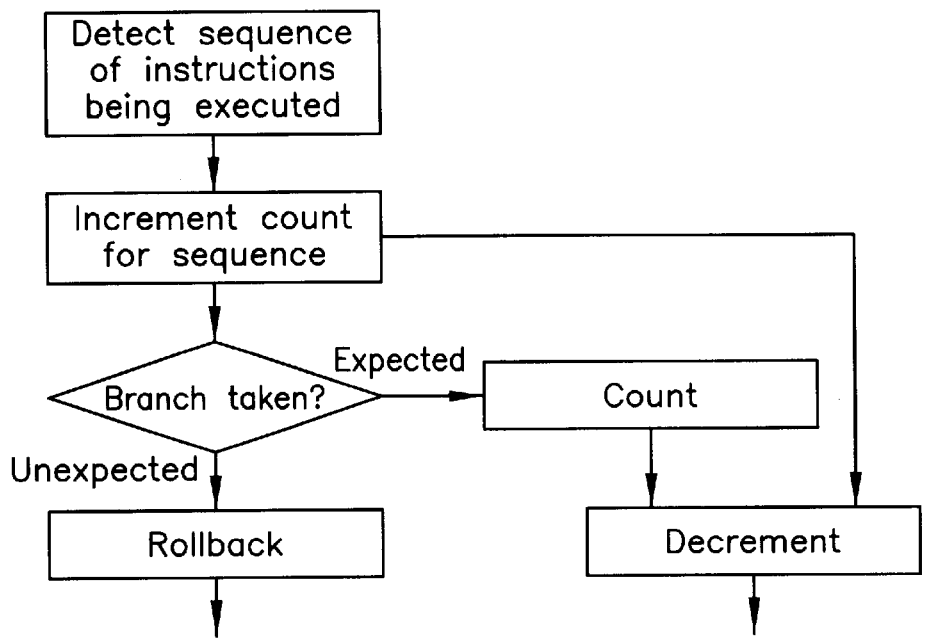
FIG. 1 is a flow chart illustrating a method in accordance with the present invention.

As a general proposition, it is possible to count individual sequences of translations to determine branches taken and to determine from such statistics when particular translations are experiencing too many rollbacks. For example, as is illustrated in the flow chart of FIG. 1, by tracking the execution of all sequences of translated instructions using the memory address of the sequence in the translation buffer, the number of times a sequence executes without rollback and branches taken may be determined. A comparison of expected branches taken with the number of times the translation was executed provides a ratio of rollbacks to executions of the sequence. The result may be used to discard sequences of translation causing too many rollbacks and thereby slowing overall system operation.

To determine the effect of rollback by this method, however, requires a great deal of system resources. A counter must be allocated to each sequence of instructions or shared between sequences, storage must be provided for each sequence and for the branch address and the number of times the branch is taken, and ratios must be computed and tested against desired values. With a program of any realistic size, this effort becomes an inordinate burden for the system.

Figure 2:
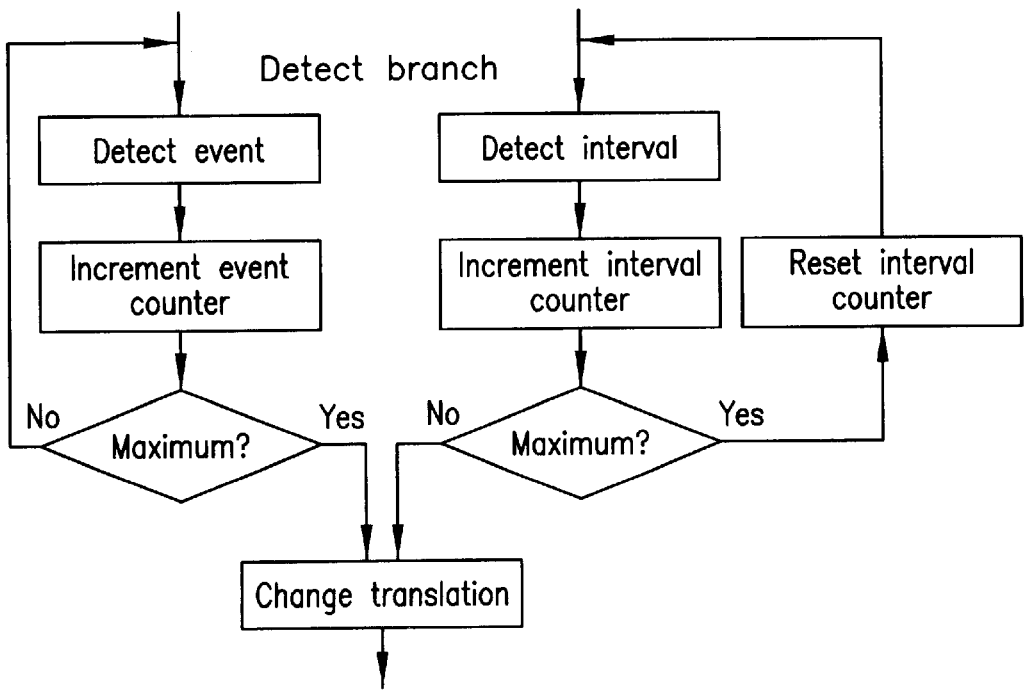
FIG. 2 is another flow chart illustrating a method in accordance with the present invention.

Consequently, a better method has been found which requires almost no system resources yet accomplishes the desired results expeditiously. The more advanced method overcomes both of these problems which result in less than desirable translations and allows the other desirable modifications to be made in translations. Essentially, the method illustrated in FIG. 2 directly tracks some system event such as rollback. If the event occurs more than some prescribed number of times during an interval, then the translation is modified so that it is handled in a more efficient manner. In the case of rollback events, this may mean that a first sequence of translated instructions is discarded and always interpreted from that point because the sequence is executed so infrequently. Or it may mean that the sequence is immediately retranslated and optimized to meet the new conditions of operation existing while executing the process.

Figure 3:
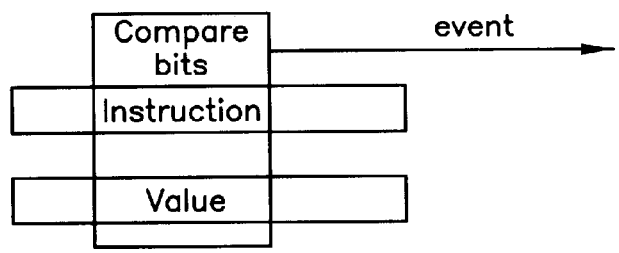
FIG. 3 is a diagram illustrating detection of one type of event.

The present invention, in general, utilizes system events which are attainable using minimal resources. Using system events which are easily attainable has allowed the desirable results of the present invention to be attained with almost no overhead in either hardware or processing time. As an example, the number of times rollback occurs may be determined by counting each rollback instruction which is executed. Determining that an instruction being executed is a rollback instruction requires a simple comparison of each instruction with a registered value indicating rollback in the manner illustrated in FIG. 3. If the two are the same, an event count is generated. Many other events may be similarly generated and counted.

Some events are already typically available in hardware for testing or other purposes. For example, a timing event is typically generated by counting down a system clock.

Even though the advanced method is most efficient when used with events which are already being monitored, the present invention may be easily extended to other system events by simply adding other event counters and utilizing the results produced by the counters in the manner taught by this invention. The hardware for this purpose requires very little additional overhead.

In accordance with the invention, the number of a particular chosen event occurring during an interval is counted, if there are more than a maximum of any chosen event, the fact is used to implement a change in the translation causing the events. For example, with rollback events, the number of rollbacks are counted within some selected interval. If there are too many rollbacks within the interval, then in one embodiment the translation sequence which causes the rollback putting the number beyond the limit is discarded.

The limiting number of rollbacks can be established by determining the number of instructions which are discarded with each rollback and finding an average loss of execution time for each rollback. From this average value, a desirable percentage of time occupied by rollback to the total time spent executing may be computed. In one case, a percentage less than two percent of total execution time was selected. This value may be set at whatever is desired by simply lengthening or shortening the interval during which the number of rollback events are summed to determine whether the sum exceeds the value. When the interval has been set at a tolerable value, if the total goes over this value, then the translated sequence which causes the value to increment beyond the limit is discarded.

In one embodiment of the invention, the discarding is accomplished by generating an exception which selects an exception handler that discards the executing translation sequence. It should be noted that the sequence of translated instructions which is discarded may not, in fact, be a sequence which is causing a large number of rollbacks to occur. It may simply be a sequence which occasionally causes a rollback and happens to occur following a number of other rollbacks during the selected interval. However, discarding an effective sequence of translated instructions will slow execution very little since the original translation will soon be replaced by a similar effective translation if the sequence is used very often. On the other hand, the poorly functioning sequences of translations which caused the build up of the rollback count will soon be discarded by the same process because any such sequence is much more likely to be the sequence which causes the rollback count to go over the limit and generate the exception causing a translation to be discarded. Once a poor translation has been discarded, the process of first interpreting, then generating a new translation, and later extensively optimizing the new translation to meet the new operating conditions begins.

There at least two types of intervals which may be utilized in accordance with the invention for evaluating the count of an event, particularly a rollback event. One of these intervals is an interval of time. Such an interval may be determined by an event counter which generates an output whenever some number of processor cycles have occurred. For example, an interval might be selected to be one-thousandth of a second with a modern processor. Another type of interval which tends to provide somewhat more accurate results when measuring the percentage of total execution time consumed by an event such as rollback is an interval based on execution of a selected number of instructions. Thus, an instruction execution may be considered as an event, and the number of instructions executed counted up to some maximum to determine an interval. Using this measure for an interval, the actual effect of each instruction is taken into account in determining the percentage of rollback time.

Utilizing the method of the present invention has a number of advantages. First, if all rollbacks are counted during an interval to determine whether to discard translation sequences and a sequence which causes the count to exceed the maximum is discarded, then only sequences which are actually being executed can be discarded. The method has no effect on either good or bad translations which are not being run. The method merely discards a translation which has caused the maximum to be exceeded. The general method of determining sequences to interpret and to translate and optimize controls the handling of sequences once they have been discarded. If a sequence is not executed often after it has been discarded, it is unlikely to be retranslated and very unlikely to be optimized extensively. On the other hand, if a sequence is executed often after a first translation has been discarded, it is very likely to be both retranslated and optimized extensively to fit the new circumstances.

Other types of events which can be utilized to provide dynamic feedback regarding sequences of translations are exceptions caused by reordering faults. The improved processor utilizes circuitry which includes means for generating an exception if there is an attempt to write to a protected memory position.

The circuitry for generating exceptions for writes to protected memory positions is used to enhance the ability of the improved processor to generate code which will execute more rapidly. The circuitry allows a scheduler to arrange speculative translations of sequences which probably will not fault. This is accomplished by storing instructions reordered by the scheduler in protected memory positions so that an attempt to write a protected position generates an exception. If a translation generates an exception by attempting to write to a protected position, then a rollback is taken. The technique is described in detail in U.S. patent application Ser. No. 09/332,338, entitled, Method And Apparatus For Enhancing Scheduling In An Advanced Microprocessor, G. Rozas et al., filed Jun. 14, 1999, and assigned to the assignee of the present invention.

The generation of this type of memory-protection exception provides an event which can be utilized in accordance with the present invention to determine that a translation is failing to provide a correct result too often. Because this type of exception doesn't necessarily indicate that the translation is wrong because the translation may often succeed, the system may count these exceptions during intervals and discard a translation each tenth time it generates an exception greater than a maximum number. If a translation is really very poor and is generating this form of exception constantly, that translation will be discarded almost immediately. If not, then the translation may remain in place and continue to generate infrequent exceptions. This same method of discarding translations only when an inappropriate operation occurs a large number of times may be utilized with other events in-accordance with the invention.

Another operation which provides an event which may be utilized to provide dynamic feedback from which translations may be modified is referred to as a "T bit exception." A T bit is placed with an entry in a translation lookaside buffer of the new processor to signal that the memory page addressed includes translated instructions. A T bit exception is generated when there is an attempt to write to a memory page which holds target instructions which have been translated into host instructions.

The purpose of the T bit is to eliminate a translation when the target instructions from which the translation was generated change. However, with some target processors (notably the Intel X86 family), memory pages can include both translated instructions and data; and writing data to the page should be allowed. Consequently, a new process has been devised by which the code morphing software may determine whether an attempted write to a memory page is to an area storing target instructions which have been translated or to a data area. The process is accomplished by dividing memory pages into smaller areas and storing indications of whether each of these smaller areas include instructions which have been translated. By checking these indications whenever a T bit exception occurs, the software may override the T bit exception so that the exception is ignored if a write is to a data area. However, if a particular page is generating a large number of these exceptions all of which are overruled, sufficient overhead is imposed on the operations that it is often desirable to simply discard the entire page and redo the translations in order to improve on the arrangement. To accomplish this, the system counts T bit exceptions and discards an entire memory page when some number of faults (e.g., 100) have occurred during a particular interval.

Another especially difficult problem may also be alleviated by the use of the present invention. Often a translation is optimized minimally because at the time the translation occurs, there is little experience with the sequence being translated. Extensive optimization would be too costly if the sequence were not used often. Such a translation may function perfectly in the sense that no rollbacks occur. However, a better optimized translation would save a great deal of processing time.

If a translation has been optimized minimally, then there are usually a number of places in the translated sequence in which "no operation" instructions ("nops") are inserted to provide correct timing between the different instructions for various purposes such as dealing with dependencies. When it has been decided that a minimal optimization is to be undertaken for a translation (e.g., on the first translation of a sequence of instructions), normal nop instructions may be replaced by "special nops" which in effect indicate a minimal effort in optimizing. If the number of "special nops" is counted and totaled during execution intervals in the same manner as rollback instructions are counted, then more than a selected number of such special nops will indicate that the translated sequence should be extensively optimized to provide better execution times.

Figure 4:
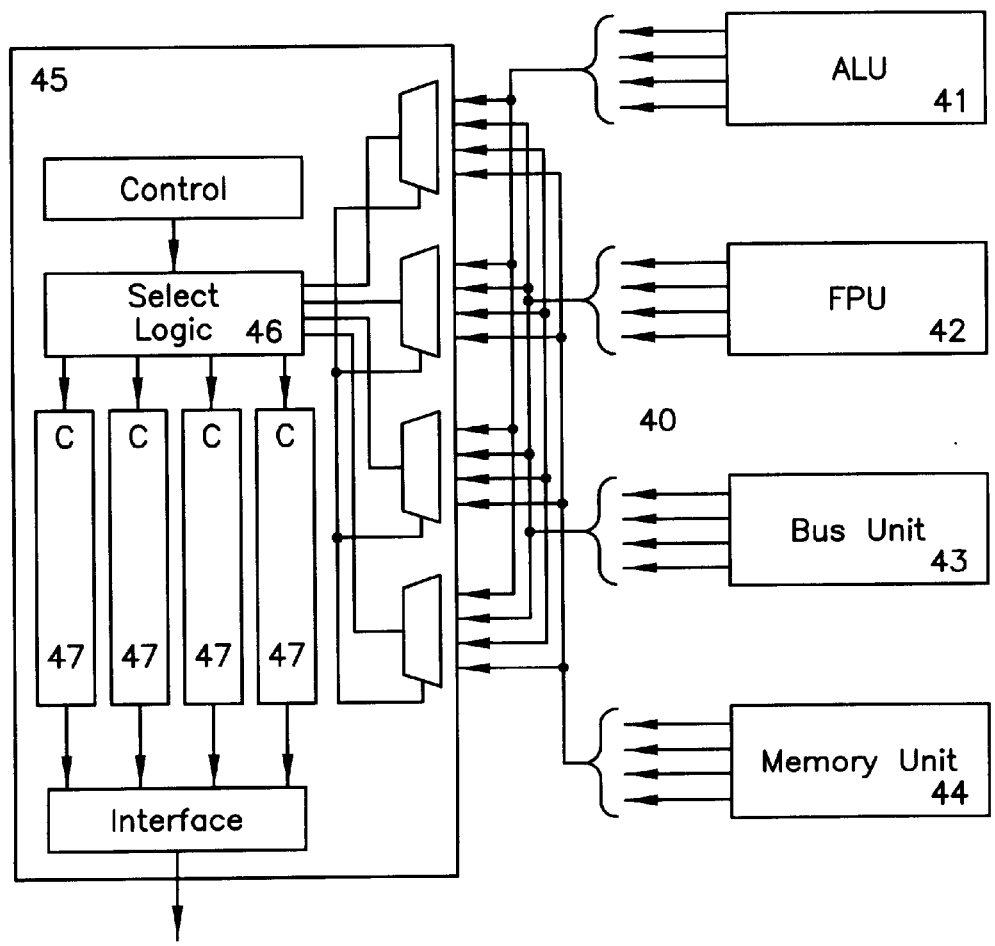
FIG. 4 is a block diagram illustrating circuitry designed in accordance with the present invention.

An embodiment of circuitry 40 for utilizing system events to determine dynamically whether translations generated by the improved processor should be modified is illustrated in FIG. 4. A number of system functional unit such as arithmetic and logic unit (ALU) 41, floating point unit (FPU) 42, bus unit 43, and memory unit 44 which generate events to be utilized in accordance with the present invention are shown. In a particular embodiment, four individual signal paths (this number may vary extensively with the system) to a counter unit 45 are provided from each of these functional units. For example, the ALU 41 may provide events depending on many different types of instructions. For each instruction which constitutes an event which is to be counted (e.g., a rollback instruction or a special nop instruction), a portion of the instruction indicating the command is compared to a value which is the instruction to be found. For example, the rollback instruction includes a certain sequence of unique bits which have a particular value. The value of the instruction is held in a value register and when the bits of the instruction and the register compare, a rollback event is generated (see FIG. 3). This event is sent to the central counter unit 45 which includes a number of counters 47 assigned to different events. Other such counters (not shown) may be more conveniently located in the various functional units where the event is itself the result of some sort of count. The counter unit 45 also includes a network of rules defined by select logic 46 by which different criteria may be used for counting. For example, a rollback event occurring during some other event might be counted. For the rollback problem, only the event itself need be counted so the events are sent directly to a counter. The select logic allows the system software to program the event or combination of events which are to cause the modification of a translation. In other embodiments, combinations may be made of the results of other combinations of events; for example, if two events are both present and two other events are not present, then a result is generated.

In one embodiment of the circuitry described in detail in U.S. patent application Ser. No. 09/417,930, Programmable Event Counter, B. Coon et al., now U.S. Pat. No. 6,356,615, filed on even date herewith and assigned to the assignee of the present invention, the select logic includes circuitry capable of testing to determine whether the following conditions are met by the input events:

X,
Y,
!X,
!Y
X&Y,
X|Y,
X^Y
!(X & Y),
!(X^Y),
!(X)|Y.
X|(!Y),
X&(!Y),
!(X|Y), where the symbols used are the typical C language bitwise manipulators.

Other events such as particular exceptions may be counted in a similar manner.

At the same time, the number of cycles of the processor may be counted to provide a timing event by which a time interval may be generated. Alternatively, the number of instructions processed by the processor may be counted to provide a processor time count. Either of these events may be used to reset the rollback or other event counter. Thus, if the rollback counter counts less than some selected number of rollback events within a period set either by the timer or by the processor instruction counter, the rollback counter is reset and nothing happens. However, if before the timer or processor instruction counter provides a reset, the rollback counter counts to the maximum value, then an exception is generated and the translation is discarded. Other circuitry for implementing the present invention will also be obvious to those skilled in the art.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A method for modifying translated instructions within a computer which dynamically translates instructions from a target instruction set to a host instruction set and compiles translated instructions to different levels of optimization comprising the steps of:

monitoring an event occurring within a component of the computer, wherein the event is the occurrence of a first exception during the execution of a translated sequence of host instructions, counting occurrences of said event occurring within a selected interval, generating a second exception if a total of the occurrences of said event within the selected interval exceeds a prescribed limit, and responding to the second exception by modifying the translated sequence of host instructions.

2. A method as claimed in claim 1 in which the step of modifying the translated sequence is discarding the sequence.

3. A method as claimed in claim 1 in which the monitoring further comprises monitoring for a second event, wherein said second event indicates a minimal attempt to optimize a translation, and the step of modifying the translated sequence is further optimizing the sequence.

4. A method as claimed in claim 1 in which the event indicates an attempt to write to protected memory.

5. A method as claimed in claim 1 in which the event indicates a scheduling error in optimizing a translation.

6. A method as claimed in claim 1 which the selected interval is a time interval.

7. A method as claimed in claim 1 in which the selected interval is a number of instructions.

8. A method as claimed in claim 1 in which the step of responding to the second exception by modifying the translated sequence of host instructions occurs after the total of the occurrences of said event within the selected interval exceeds a prescribed limit a selected plurality of times.

9. A method as claimed in claim 1 in which the event is a combination of events.

10. An apparatus for modifying translated instructions within a computer which dynamically translates instructions from a target instruction set to a host instruction set and compiles translated instructions to different levels of optimization comprising:

means for monitoring an event occurring within a component of the computer, wherein the event is the occurrence of a first exception during the execution of a translated sequence of host instructions, means for counting occurrences of said event occurring within a selected interval, means for generating a second exception if a total of the occurrences of said event within the selected interval exceeds a prescribed limit, and means for responding to the second exception by modifying the translated sequence of host instructions.

11. An apparatus as claimed in claim 10 in which the event is a rollback, and the means for responding to the second exception by modifying the translated sequence comprises means for discarding the sequence.

12. An apparatus as claimed in claim 10 in which the means for monitoring further monitors a second event, wherein said second event indicates a minimal attempt to optimize a translation, and the means for responding to the second exception by modifying the translated sequence comprises means for further optimizing the sequence.

13. An apparatus as claimed in claim 10 in which the event indicates an attempt to write to protected memory.

14. An apparatus as claimed in claim 10 in which the event indicates a scheduling error in optimizing a translation.

15. An apparatus as claimed in claim 10 in which the selected interval is a time interval.

16. An apparatus as claimed in claim 10 in which the selected interval is a number of instructions.

17. An apparatus as claimed in claim 10 further comprising means for responding to the second exception after the total of the occurrences of said event within the selected interval exceeds a prescribed limit a selected plurality of times.

18. An apparatus as claimed in claim 10 in which the event is a combination of events.

19. A method for modifying translated instructions within a computer which dynamically translates instructions from a target instruction set to a host instruction set and compiles translated instructions to different levels of optimization comprising the steps of:

monitoring a event occurring within a component of the computer, wherein the event indicates an attempt to write to protected memory, counting occurrences of said event occurring within a selected interval, generating an exception if a total of the occurrences of said event within the selected interval exceeds a prescribed limit, and responding to the exception by modifying a translated sequence of host instructions.

20. A method for modifying translated instructions within a computer which dynamically translates instructions from a target instruction set to a host instruction set and compiles translated instructions to different levels of optimization comprising the steps of:

monitoring a event occurring within a component of the computer, wherein the event indicates a scheduling error in optimizing a translation, counting occurrences of said event occurring within a selected interval, generating an exception if a total of the occurrences of said event within the selected interval exceeds a prescribed limit, and responding to the exception by modifying a translated sequence of host instructions.

* * * * *